March 22, 1927.

H. N. TRACY 1,621,694

PLACER DEPOSIT WASHER AND METHOD OF WASHING

Filed Jan. 22, 1923    11 Sheets-Sheet 1

Harmon N. Tracy.
Inventor his Attorneys

March 22, 1927.

H. N. TRACY 1,621,694

PLACER DEPOSIT WASHER AND METHOD OF WASHING

Filed Jan. 22, 1923      11 Sheets-Sheet 2

Fig.3.

Inventor:
Harmon N. Tracy.
By
his Attorney

March 22, 1927. 1,621,694
H. N. TRACY
PLACER DEPOSIT WASHER AND METHOD OF WASHING
Filed Jan. 22, 1923 11 Sheets-Sheet 3

Fig. 4.

Inventor:
Harmon N. Tracy,
By his Attorney

March 22, 1927.

H. N. TRACY 1,621,694

PLACER DEPOSIT WASHER AND METHOD OF WASHING

Filed Jan. 22, 1923    11 Sheets-Sheet 5

Inventor:
Harmon N. Tracy

Inventor:
Harmon N. Tracy
By his Attorney

March 22, 1927.

H. N. TRACY 1,621,694

PLACER DEPOSIT WASHER AND METHOD OF WASHING

Filed Jan. 22, 1923  11 Sheets-Sheet 8

March 22, 1927.

H. N. TRACY 1,621,694

PLACER DEPOSIT WASHER AND METHOD OF WASHING

Filed Jan. 22, 1923  11 Sheets-Sheet 11

Fig.17.

Inventor:
Harmon N. Tracy.
By his Attorneys

Patented Mar. 22, 1927.

1,621,694

UNITED STATES PATENT OFFICE.

HARMON N. TRACY, OF LOS ANGELES, CALIFORNIA.

PLACER-DEPOSIT WASHER AND METHOD OF WASHING.

Application filed January 22, 1923. Serial No. 614,138.

This invention has to do with portable or traveling devices for handling and washing placer deposits to obtain their precious metals or other values; and it may be stated as one of the general objects of the invention to provide a device that can travel over a placer deposit, handling the deposit material to any desired depth, extracting the values, and do all this without using a large quantity of water and without having to move the materials any great distances. There are numerous other objects of the invention designed for efficiency of action; but it will be unnecessary to state such objects preliminarily as they will be best understood, as also the corresponding accomplishments and features of the invention, from the following detailed description.

I am aware that it has been more or less common practice to handle a placer deposit by a device mounted on a barge floating in a body of water (an artificial pond, for instance) in the placer deposit; the barge being equipped with the necessary mechanism for shoveling or dredging at one end of the pond and the washed materials being deposited at the other end of the pond, the pond being thus advanced through the placer deposit. This procedure has involved the use of comparatively large quantities of water, and makes the method impossible in many situations. My invention provides a device adapted to travel on the deposit material itself, without the aid of a body of water in which to float the device. For these purposes the device is supplied, not only with mechanisms for handling and washing the deposit materials but also with devices for laying a fairly level or fairly smooth roadbed for the machine to travel on, and also with devices for keeping the whole arrangement on a level to facilitate efficient action of the concentrating mechanisms.

All of these things will be best understood from the following detailed specification of a specific embodiment of the invention, reference for this purpose being had to the accompanying drawings in which:—

Figure 1:
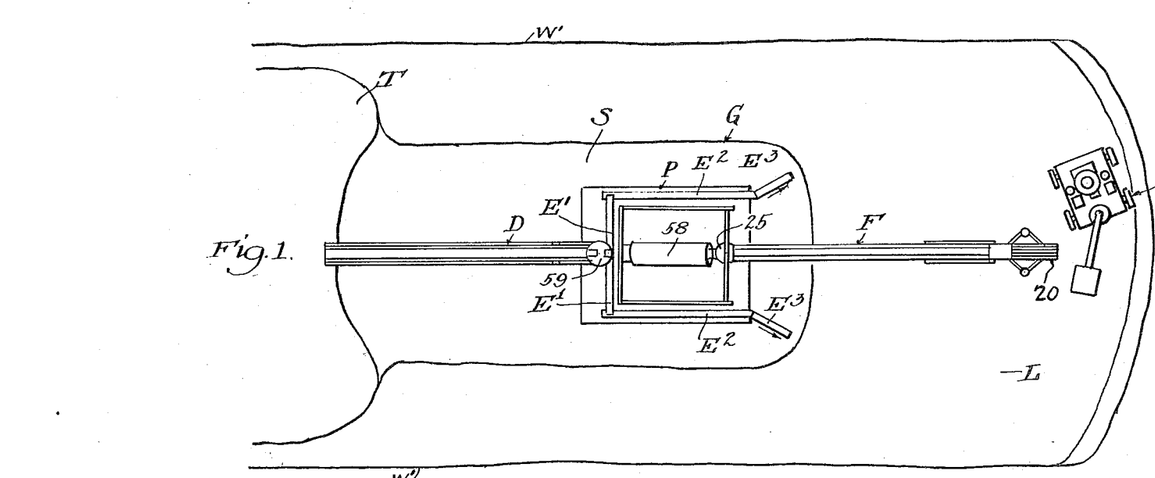
Fig. 1 is a plan showing my mechanism as it typically appears in operation.
Figure 2:
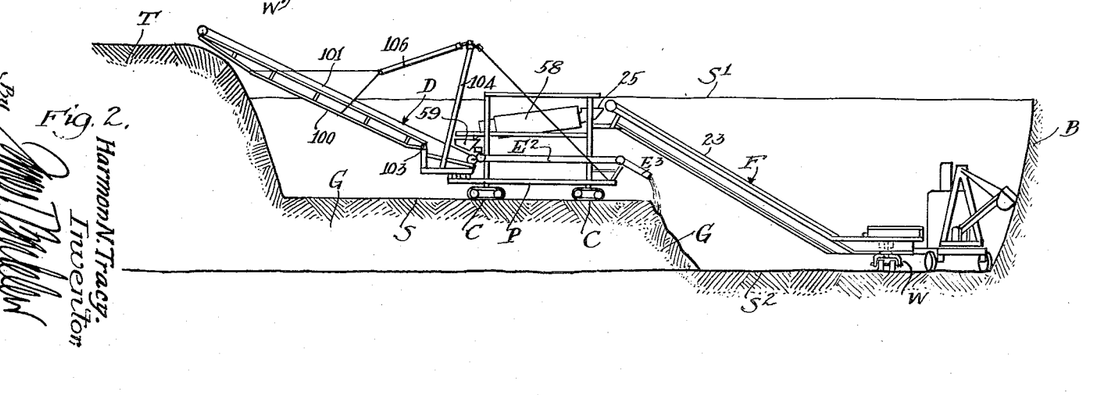
Fig. 2 is a side elevation of the same.
Figure 3:
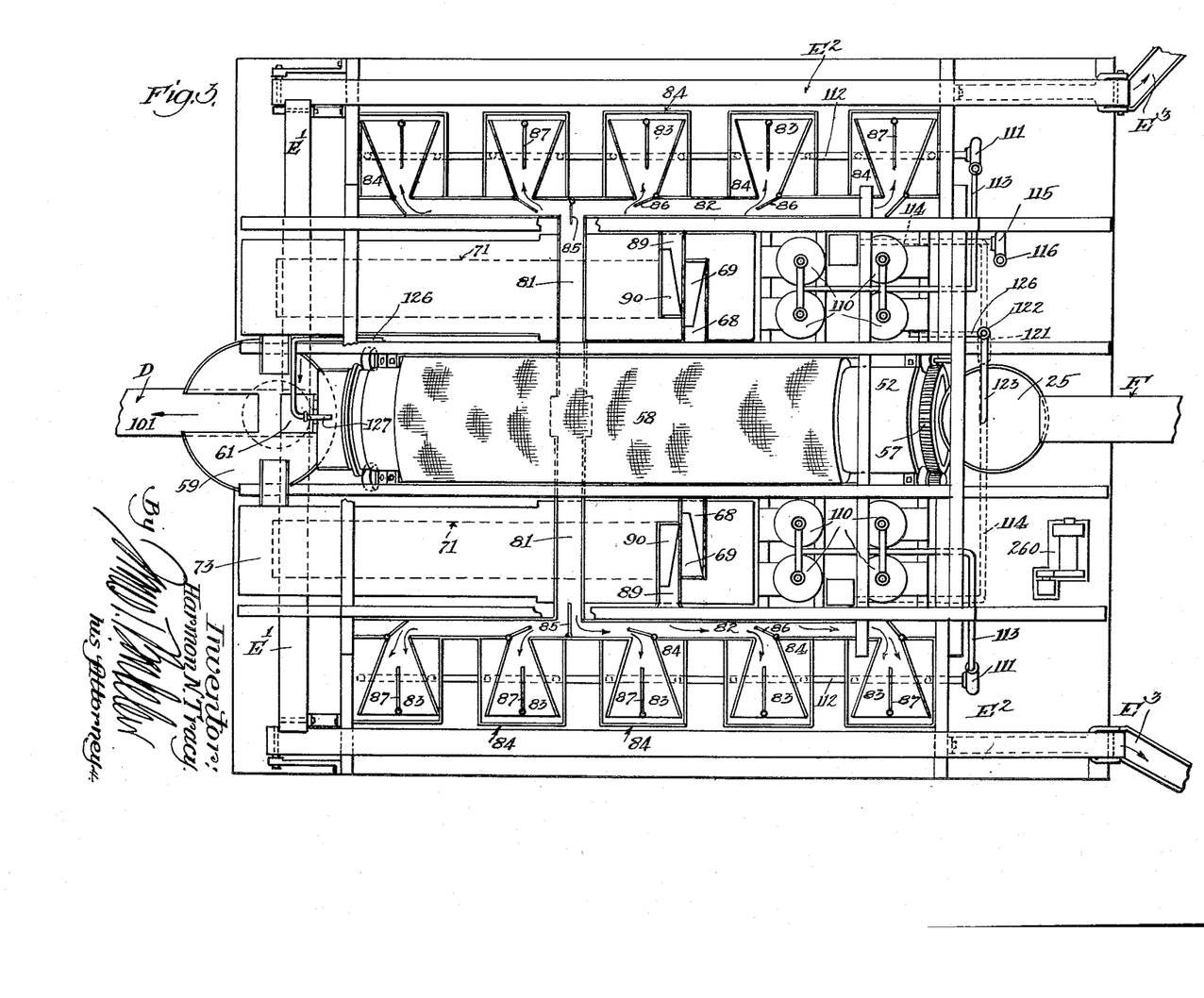
Fig. 3 is an enlarged plan of the main parts of the complete mechanisms, omitting the conveyer devices that extend from the ends of the mechanism.
Figure 4:
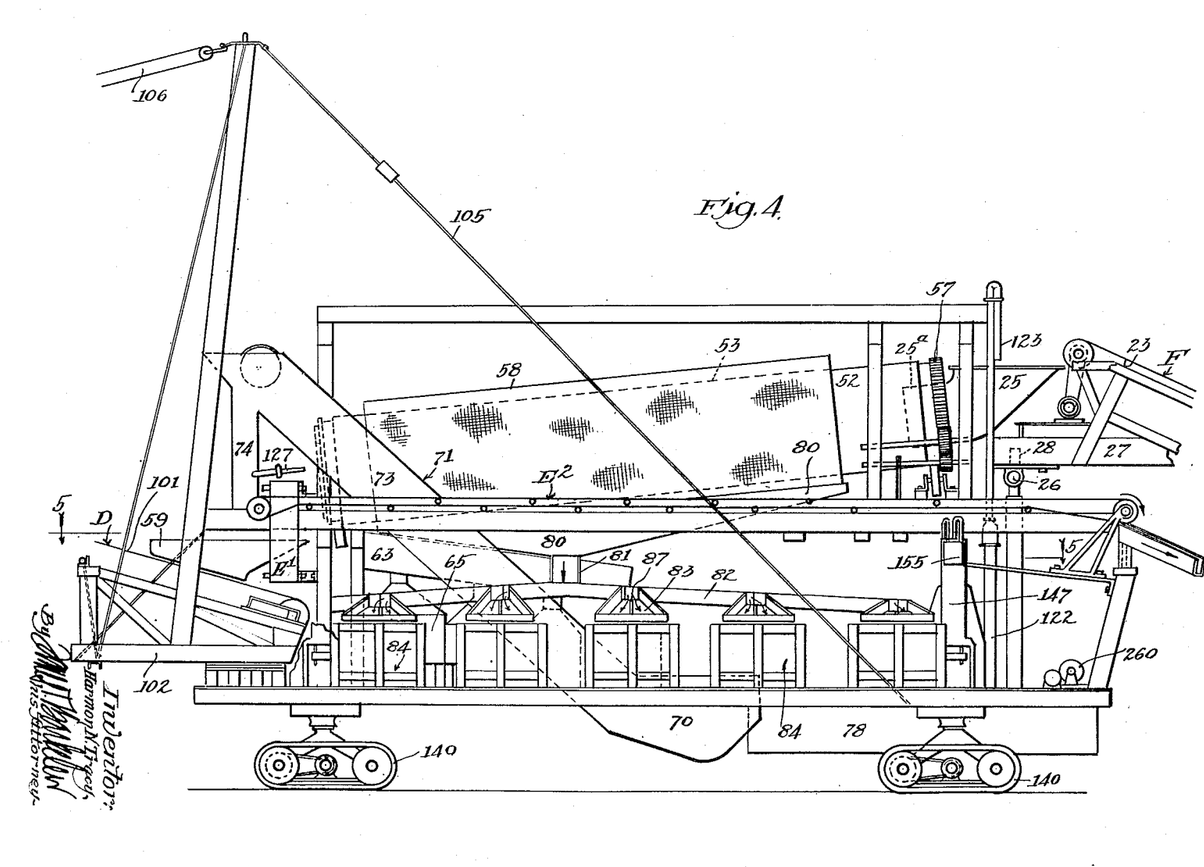
Fig. 4 is a side elevation of the parts appearing in Fig. 3.

I will give first a general description of the mechanism as a whole, and its general method of operation and then proceed to a description of the details of structure and operation. For this purpose I will refer first more particularly to Figs. 1 and 2. These figures are designed to show only the general layout of the complete device and not to illustrate any of its details. The body of the device is carried on a framed platform or floor P mounted on wheels or caterpillar mechanisms C, so that it may move forwardly over surface S of a pile of gravel G that is laid as the device progresses. The front end of the device carries a feed conveyer F of suitable length and the forward end of the conveyer is preferably independently supported by wheels or other suitable devices as illustrated at W so that the weight of the conveyer is not wholly supported by the frame of the device. This conveyer is flexible so as to be operatable at different levels and so as to be swung from side to side of the cut along the line of travel indicated at L in Fig. 1. To load the conveyer I prefer to employ a steam shovel A which works at the forward bank B of the cut. The material loaded on feeding conveyor F is carried thereby into the devices on platform P and, after the values are there extracted, the washed gravel (I will speak of the placer deposit materials as gravel) is delivered partly to the discharge conveyer D which piles the material in the main tail pile T. Conveyer D may be moved both as to height and lateral position so that the materials are piled in a position substantially to fill the cut that has been made from side to side; but the tail pile T is so regulated that, at its top at least, it does not overlap the side walls $W^1$ of the cut; so that the machine can again make a cut alongside the previously made one and only handle fresh material. The top of pile T will of course be somewhat higher than the original surface $S^1$ as the gravel will expand somewhat in bulk during handling.

Another part of the washed gravel is delivered to two duplicate conveyer systems $E^1$, $E^2$, $E^3$, the element $E^3$ of which is a dirigible chute that can be shifted around to deliver washed gravel ahead of the platform and distribute it to form the pile G with a fairly smooth and level surface S. As the machine progresses through the placer deposit, this pile G is formed of a height less than the depth of the cut so that the machine is supported and runs on the surface S at a distance above the floor surface $S^2$ of the cut. This puts the machine in a position where neither of the conveyers F nor D need be especially long, as the conveyer F then does not have to reach down very far below the level of the machine and the conveyer D does not have to pile material at a great height above the machine. This arrangement also materially decreases the total amount of work done in handling the gravel.

Any large rocks that are encountered may be placed or left on the bottom surface $S^2$, the gravel around and under them being cleaned out by hand if necessary. Any suitable means may be used to move such rocks around as a small winch 260; and these rocks will of course be covered by the road-bed pile.

Figure 8:
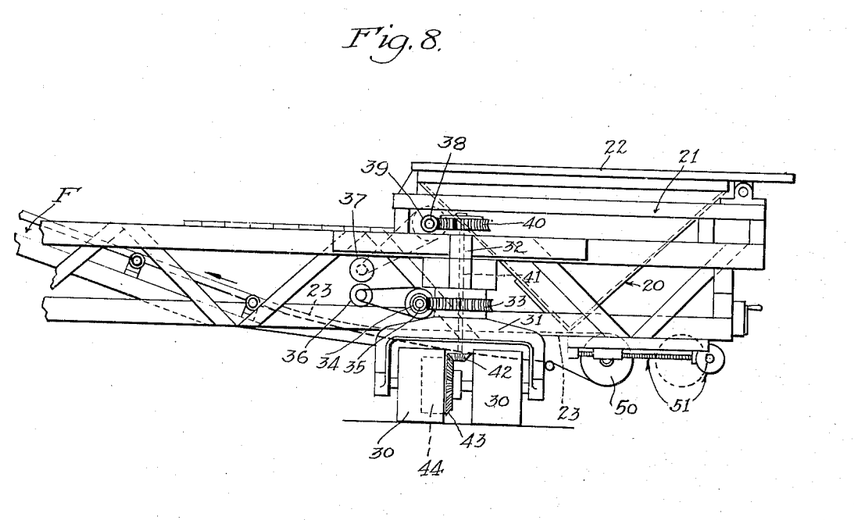
Fig. 8 is an enlarged side elevation of the forward end of the feed conveyor.
Figure 9:
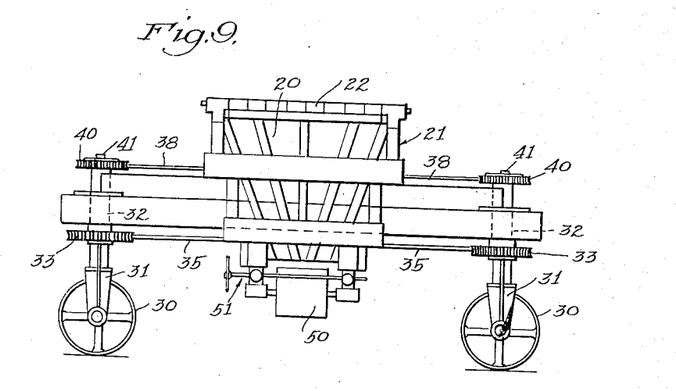
Fig. 9 is an end elevation of the parts shown in Fig. 8.

The depth of cut may vary, depending on the depth of the placer deposit being worked; and the proportionate height of pile G may also be varied to suit different circumstances. It will also be apparent that at the beginning of operations the cut may be made first with a sloping bottom to let the machine down to its normal working depth; and then when the end of the deposit or the end of a run is reached, the pile G may be gradually built up at a slope to lift the machine out of the cut. The material excavated by steam shovel A is loaded into a hopper 20 supported in a framework 21, the material passing through a grizzly 22. From the hopper the material drops onto conveyer belt 23 and is conveyed up feed conveyer F and delivered into a hopper 25 at the upper end of the conveyer. The upper end of the conveyer is hinged at 26 for vertical adjustment; and the framework 27 that carries the upper end of the conveyer is also revoluble at 28 around a vertical axis to allow the conveyer to move from side to side of the cut. The lower end of the conveyer is supported as is best shown in Figs. 8 and 9, on caster wheels 30 mounted in frames 31 pivoted on vertical pivots 32. To align these caster wheels with the direction of movement of the conveyer and over the ground, I provide worm wheels 33 on the caster trunnions and operate them by worms 34 mounted on a shaft 35 driven from a motor 36, suitable control for which is provided but is not illustrated in the drawings. To move the lower end of the conveyer in any direction thus selected, the two wheels 30 of each caster are driven from a motor 37 that drives shaft 38 carrying worms 39 meshing with worm wheels 40 on the upper end of shafts 41 that extend down through the caster trunnions 32 and drive a bevel gear 42 meshing with another bevel gear 43 of a differential device 44 that drives the two caster wheels 30. The details of the differential need not be explained as they are commonly known. This motor 37 is also provided with a suitable control. I may state here generally that all of the motors in this mechanism are simply typical illustrations of some prime mover or some convenient way of getting power for driving different parts of the machine. Although any type of prime mover or power application may be used, with a suitable control, I here illustrate motors as being most suitable for general use; and it will be understood that all of these motors have suitable controls, although I do not illustrate them except in some instances where the control is unusual in its operation.

The lower end of conyeyer belt 23 runs over a drum 50 provided with a device at 51 for moving the drum to keep the conveyer belt properly tightened.

Figure 11:
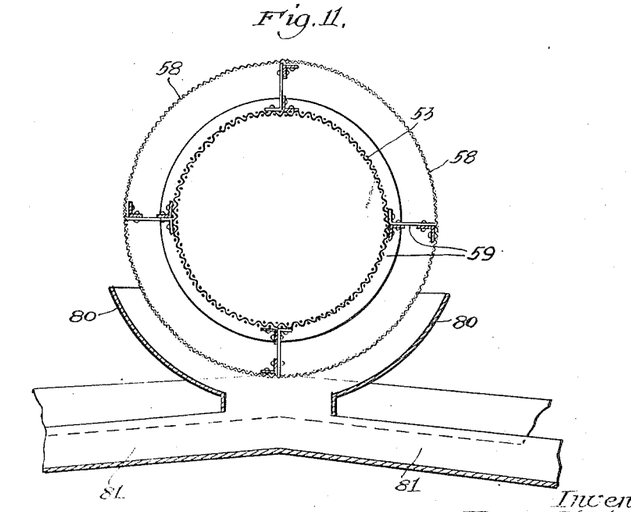
Fig. 11 is an enlarged section on line 11—11 of Fig. 6.

The material delivered into hopper 25 passes through the hopper discharge end $25^a$ into a rotating drum 52 that leads into the inner coarse screen 53 of the revolving screen drum shown in the drawings. This screen drum is supported at its ends on suitable rollers 54 and is driven from a motor 55 through the medium of sprockets 56 and gears 57. The structure of the screen drum is shown in the various drawings and particularly in Fig. 11. The inner coarse screen 53 is cylindrical and lies within the outer finer screen 58, the two screens being spaced by a framing structure 59. The screen drum stands at a slope; so that the coarsest materials pass out of the lower rear end of the inner coarse screen 53 into a hopper 59 from which the piling or discharge conveyer D carries the material away. The materials pass into hopper 59 through a small chute 60; and where this chute delivers into hopper 59 there is a gate 61 that may be regulated to deliver a certain part of the materials onto the two lateral belts E¹ that carry that part of the material to the distributing chutes E³ at the forward corners of the machine. The coarsest material is thus merely carried through the mechanism, separated from the finer materials, and discharged. The washed gravel from the other parts of the original material is also finally discharged into hopper 59; so that all the waste material is then discharged by conveyer D and the chutes E³. How the remaining parts of the materials, that are separated by the screens 53 and 58, finally get to hopper 59 will now be described.

Figure 10:
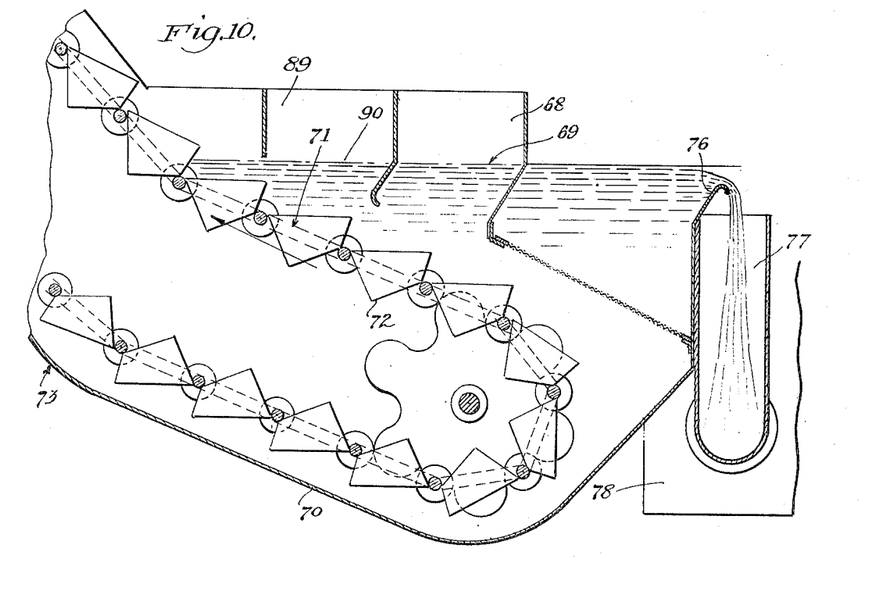
Fig. 10 is an enlarged detail section taken on line 10—10 of Fig. 5.

The materials that pass through coarse screen 53 drop onto fine screen 58 which makes another size separation. The coarser parts pass out the lower end (left hand end in Fig. 6) of screen 58 and drop directly into a cross chute 62 which divides the material and delivers it equally to chutes 63 from which individual delivery chutes 64 lead to the coarse jigs 65 (see particularly Figs. 5, 6, and 7). The tailings from these coarse jigs go out through chutes 68 and pass down through openings 69 into the box or casing 70 that houses the lower end of bucket conveyer 71. (See particularly Figs. 5 and 10). This bucket conveyer has perforated buckets as indicated at 72, to allow the water to drain from the gravel as the buckets ascend. The conveyer is housed in a housing 73 so that the water is carried back down to the casing 70. The upper end of conveyer 71 dumps into a chute 74 that leads to hopper 59. The water accumulates in casing 70 until it reaches the level of discharge wall 76 over which the water discharges into a pipe 77 that leads to water tank 78. This water tank carries the storage of water for the system.

It is not necessary to go into the details of structure of jigs 65 as those mechanisms are commonly known. I may use a jig, separator, of concentrator, of any suitable type.

The fine materials drop through the fine outer screen 58 into a launder 80 and are distributed equally to opposite sides of the machine through the two chutes 81 to the two longitudinal chutes 82 whence the fine material flows through individual chutes 83 to the fine jigs 84. To control and equally distribute the fine material to these several jigs I employ movable gates 85 and 86; and to control and distribute the flow of fine material uniformly over each jig I employ movable gates or deflectors 87. The washed fine gravel from fine jigs 84 goes out through chutes 88 into cross-chutes 89 and is dropped through openings 90 into the lower end of elevator conveyer 71. It will be noted that the movement of the elevator buckets is such that each bucket takes coarse material from chute 68 first and afterwards takes fine material from chute 89. This arrangement of the material facilitates drainage of water from the loads in the buckets. This material, drained of its water, is delivered through chute 74 into hopper 59 and thence goes to the discharge conveyers as before explained.

Discharge conveyer D needs no extended detailed description. Referring to Figs. 2, 4, 5, and 6 it will be seen that this conveyer has a frame work 100 and a traveling belt 101. The lower end of the frame work is mounted on a turn-table 102; and the main part of the frame 100 is pivoted at 103 for vertical adjustment of the discharge end of the conveyer. Derrick posts at 104, braces at 105, and a tackle at 106 provide for support and adjustment of the outer end of the discharge conveyer so that the washed material may be piled in the tail pile T as desired. On the floor P I provide two sets of amalgamators 110 into which the concentrates from the jigs 84 are pumped by pump 111 through pipe lines 112 and 113. The black sand and other fine matter that is separated from the values in the amalgamators goes through pipes 114 to a pump 115 and by this pump is pumped out through pipe 116, either to be disposed of in any manner or to be saved if desired.

It is, in most cases, necessary only to handle mechanically the concentrates from the jigs 84 that handle the finer material; it is not necessary usually to provide mechanical handling means for the concentrates from the coarse jigs 65, as the amount of concentrates in those jigs is comparatively small and they can be manually removed from the coarse jigs to the amalgamators.

The main water tank of the device is shown at 78 below the platform P. From this tank a main pipe line 120 extends to a pump 121. This pump pumps water up through pipe 122 and thence through a pipe 123 into hopper 25 along with the fresh material that is being dumped into the hopper, and also through a pipe 126 that leads to the rear end of the screen drum and discharges through a nozzle 127 through the rear lower end of the drum to additionally water the material in the drum. Practically all of the water that is thus introduced to the material passes along with the finer material through the screens and through the jigs and then into the elevating conveyer 71, where the water is separated from the material as hereinbefore described and flows back into water tank 78. The loss of water is thus comparatively small.

By providing a tank to carry the water supply for the mechanism I entirely obviate the necessity of constructing water ponds along the course of the machine. I thus not only obviate the cost of constructing water ponds at various places but also the high seepage losses that inevitably take place from such ponds. There is very little loss of water in my device; and the loss may be easily supplied by a small movable pump line from any available source.

Figure 12:
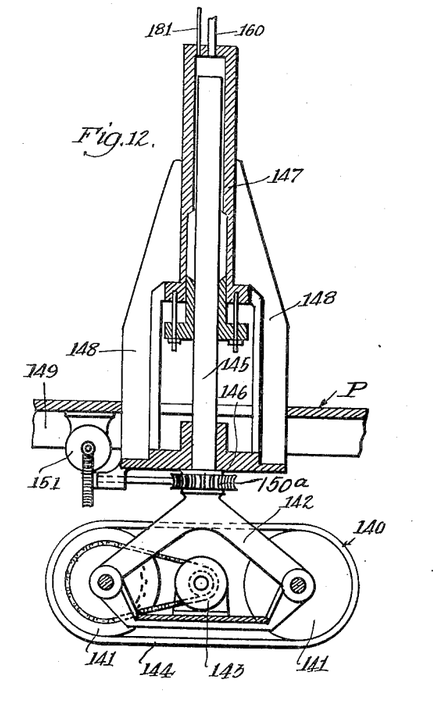
Fig. 12 is an enlarged section on line 12—12 of Fig. 5.
Figure 13:
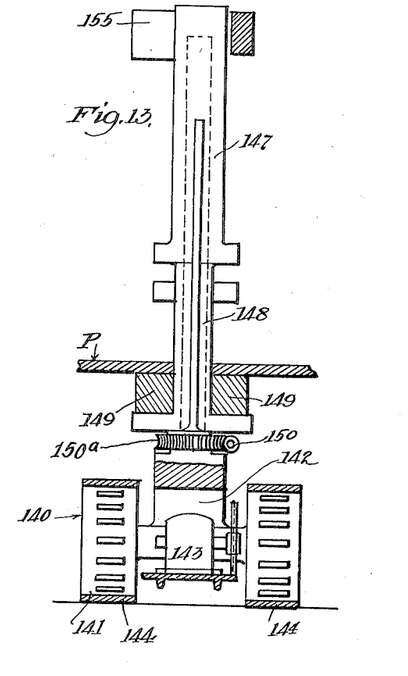
Fig. 13 is a side view of the parts shown in Fig. 12.

In order to mount the whole mechanism so that it may be movable, I preferably mount it on four caterpillar devices 140. Of course any suitable support of a mobile character may be used; but I prefer a caterpillar device as it gives a large bearing surface capable of supporting the heavy weight of the machine. These caterpillar devices, four in number, are each constructed and mounted as is shown best in detail in Figs. 12 and 13. The two wheels 141 are mounted on a frame 142 that also carries a driving motor 143; these driving motors serving to propel the whole mechanism as desired. The caterpillar belts 144 run on wheels 141 in the usual manner. The frame 142 is mounted on the lower end of a vertical plunger shaft 145. This plunger shaft 145 extends up through a bearing plate 146 and extends further upwardly into a cylinder 147 carried on a heavy frame 148 that connects with bearing plate 146. Bearing plate 146 bears upwardly against the framing 149 of the platform P. Plunger shaft 145 acts not only as a trunnion about which the caterpillar device is turned (being turned by the worm gearing 150, 150$^a$ which is rotated, for instance, by motor 151) but also serves as a plunger acting in cylinder 147 by which the whole mechanism may be raised or lowered with reference to the caterpillar device. Gear 150$^a$ may be splined on plunger shaft 145 so as to rotate therewith but remain stationary as regards vertical movement. There being one of these mechanisms at each of the four corners of the device (see positioning of cylinders 147 on Fig. 5 for instance), and the introduction and exhaust of fluid pressure from the several cylinders 147 being individually and automatically controlled, the whole mechanism can be and is maintained automatically in a level position.

Figures 14, 15, 16:
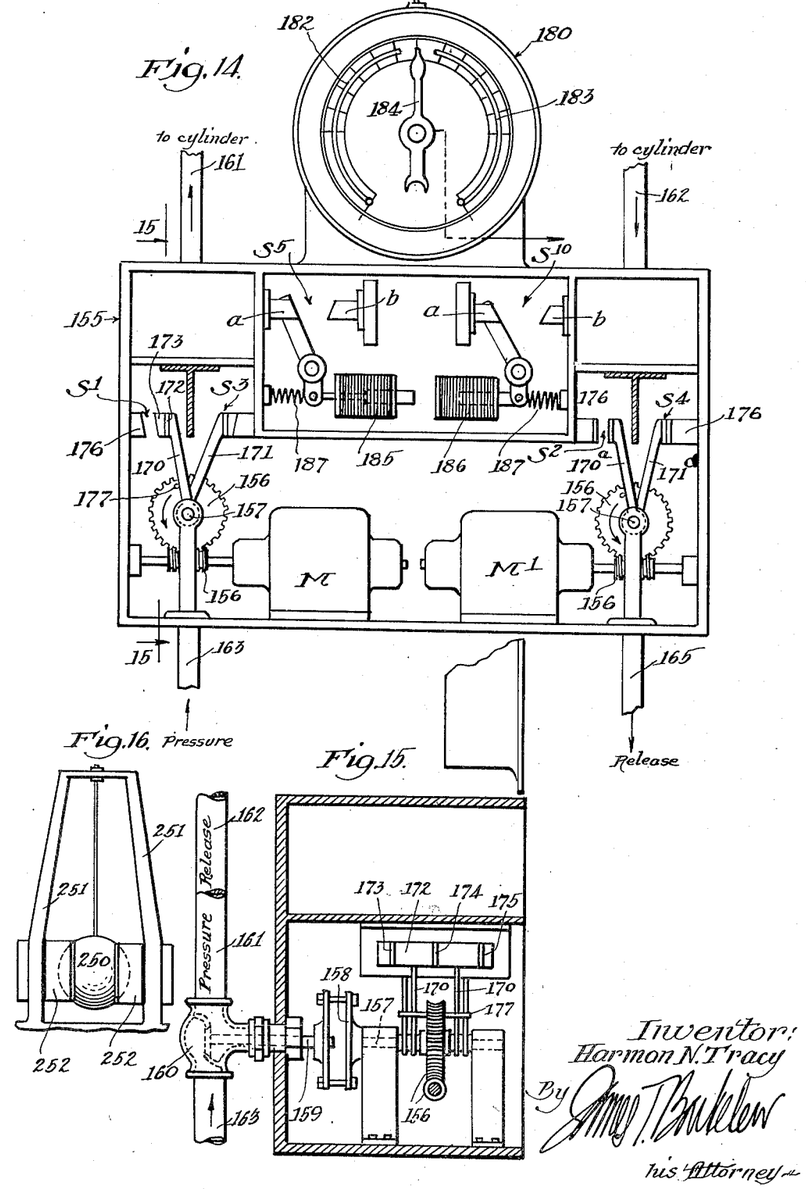
Fig. 14 is a front view of the control devices for the leveling mechanisms.
Fig. 15 is a view on line 15—15 of Fig. 14.
Fig. 16 is a side elevation of another part of the leveling control device.
Figure 17:
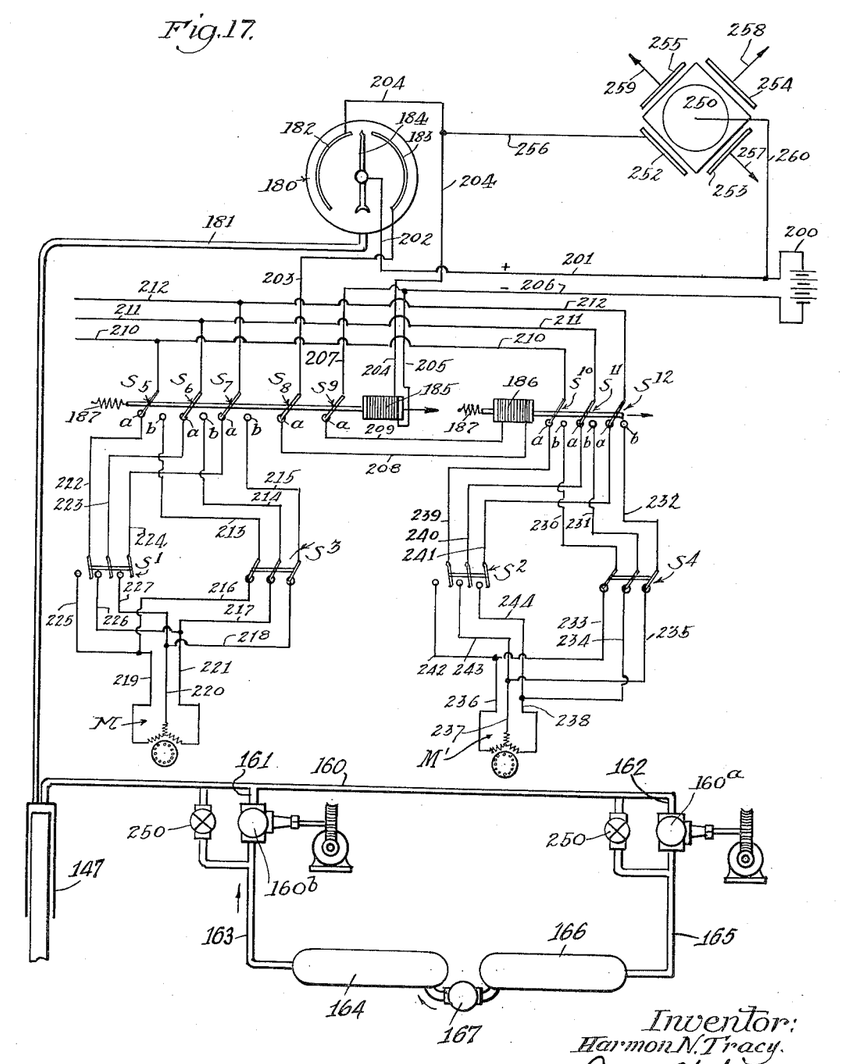
Fig. 17 is a diagram showing the electrical and hydraulic connections of the control devices.

In order to explain the automatic control of the leveling devices, I will now refer more particularly to Fig. 17, where the control mechanism for one of the cylinders is shown in diagram. Each cylinder has its own individual control mechanism, so that a description of one, and a description of the interconnection between the four, will suffice to clearly describe the whole action. Individual control mechanisms for each cylinder may be contained in a suitable box, whose location is indicated at 155 in Fig. 5. This box, and a suitable arrangement of mechanism in it, is shown in Figs. 14 and 15.

Figure 6:
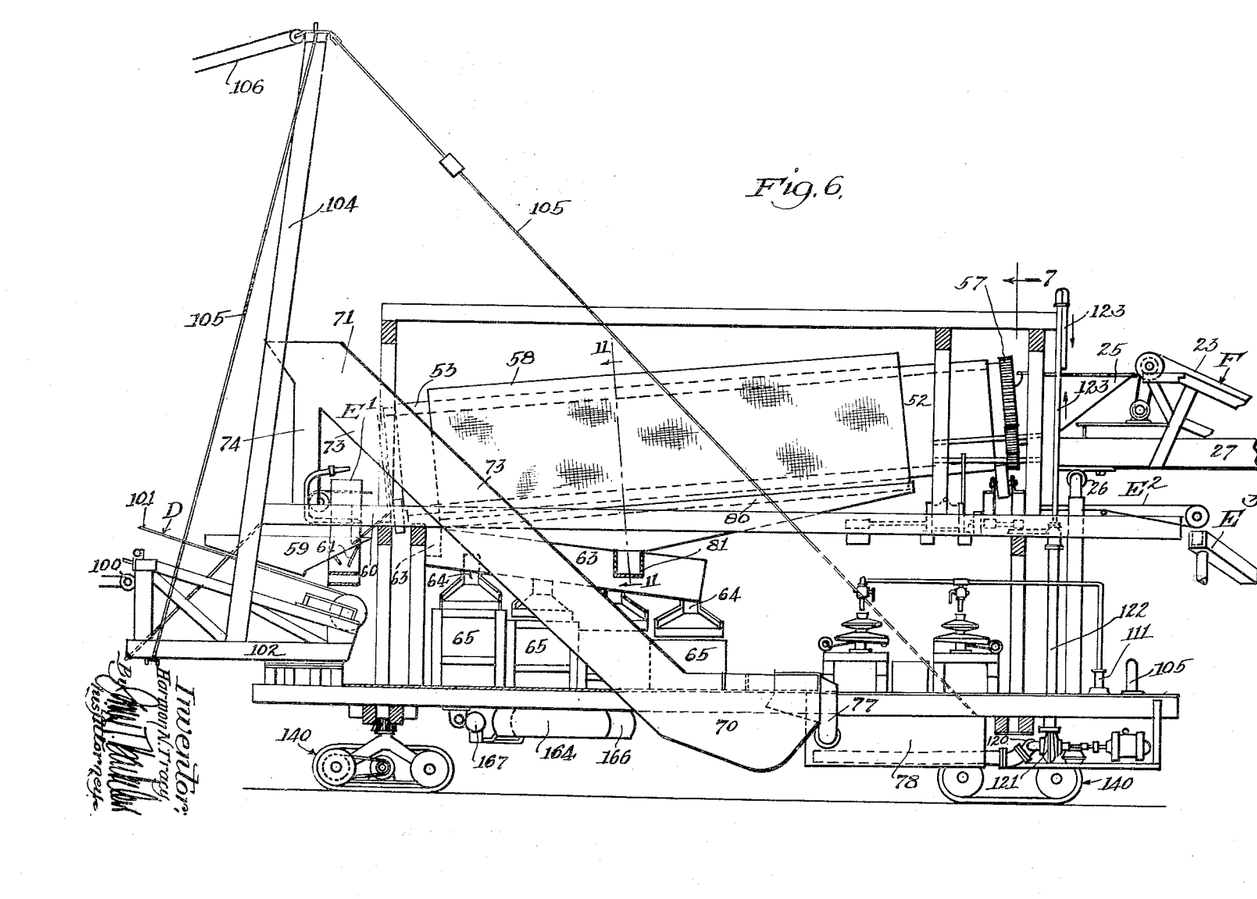
Fig. 6 is an elevational section on line 6—6 of Fig. 5.
Figure 7:
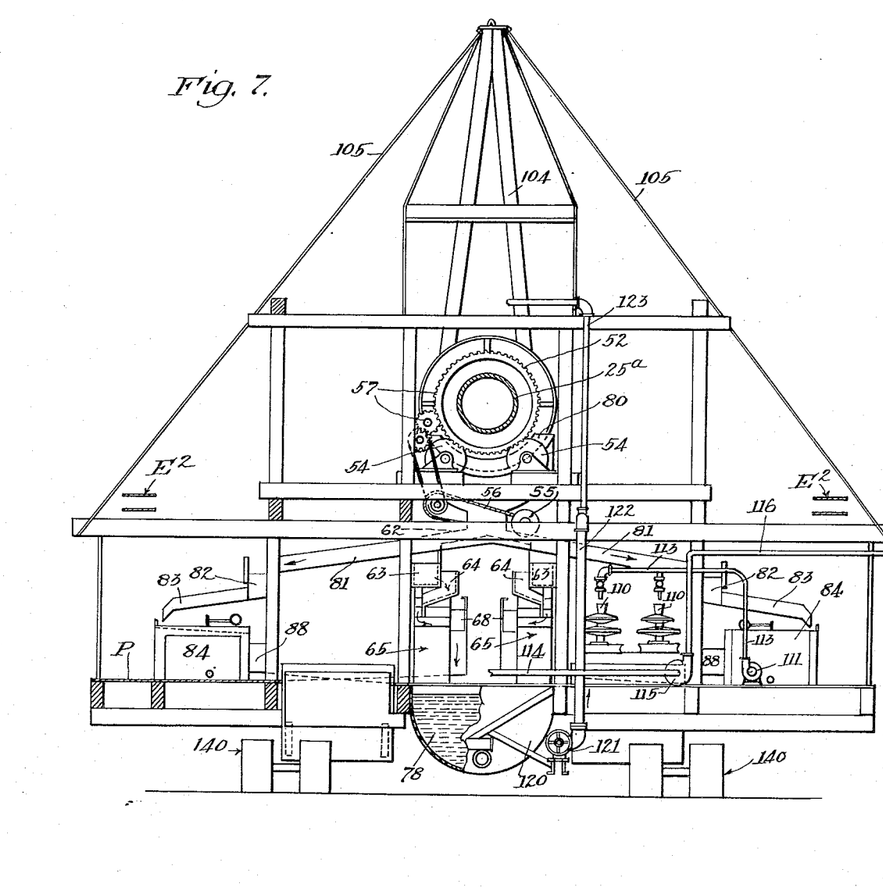
Fig. 7 is partly an end view and partly a vertical cross section taken as indicated by line 7—7 on Fig. 5 and line 7 on Fig. 6.

There are two motors M and M$^1$ each of which drives, through the medium of worm gears 156, a valve shaft 157. Each valve shaft is connected through a coupling 158 with stem 159 of a valve 160 or 160$^a$. In Fig. 15 only valve 160$^b$ is shown as valve 160$^a$ is directly behind it. Valve 160$^a$ however, is shown in the diagram of Fig. 17. A pipe 160 extends out of the cylinder head and connects by branch pipes 161 and 162 with valves 160$^b$ and 160$^a$, respectively; and from valve 160$^b$ a pipe 163 connects with pressure tank 164, while from valve 160$^a$ a pipe 165 connects with a sump tank 166. A motor operated pump 167 pumps liquid (which is preferably oil) from tank 166 into tank 164 and keeps up a constant high pressure in tank 164. The two tanks 164 and 166 and pump 167 may be conveniently mounted under platform P, in such a position as is shown in Fig. 6.

Mounted around each valve shaft 157 are two independent sets of switch carrying arms 170, 171, and 170$^a$, 171$^a$. Each set of arms, as for instance, the set 170, carries a bar 172 that carries three switch knives 173, 174, and 175 adapted to engage with switch members 176. Each worm wheel 156 carries a pin 177 that, in the normal position of the valve operating parts, with the valves closed, engages the arms 170 or 170$^a$, and holds the switches S$^1$ and S$^2$ open. With the parts in these positions, the switches S$^3$ and S$^4$ are closed. If either of the motors is rotated to turn valve shaft 157 in the direction indicated by the arrows in Fig. 14, the pins 177 leave the switch arms 170 or 170$^a$ allowing the switches S$^1$, S$^2$ to close by gravity; and after a certain amount of rotation, these pins come into engagement with switch arm 171 or 171$^a$ and open the switch S$^3$ or S$^4$, as the case may be. Then, upon reverse rotation of the motor, the opposite action takes place, switch S$^3$, for instance, being allowed to close by gravity and switch S$^1$ being finally opened. The valves 160 and 160$^b$ may be of the ordinary globe valve or similar type, and the arrangement is such that the valves are closed tightly when the parts are in the positions shown in Fig. 14 whereas they are opened sufficiently to allow proper passage of fluid when the parts are turned through a distance something less than a complete revolution.

Mounted on each box 155 there is a pressure gauge 180 connected by pipe 181 to the corresponding cylinder 147. This pressure gauge is provided with two contact strips 182 and 183 with which the indicator hand 184 comes into contact when the pressure falls below normal or rises above normal, as the case may be. There are also other automatic control switches in box 155; and to operate the control switches, for the sake of simplicity in this illustration, I show them as operated by solenoids 185 and 186. Thus solenoid 185 operates and controls switches $S^5$, $S^6$, $S^7$, $S^8$ and $S^9$ while solenoid 186 operates and controls switches $S^{10}$, $S^{11}$ and $S^{12}$. These switches are normally held by springs 187 in position to throw their switch arms into engagement with their contacts $a$. Switches $S^8$ and $S^9$ are single throw switches while switches $S^5$, $S^6$, $S^7$ and $S^{10}$, $S^{11}$, and $S^{12}$ are double throw switches, and upon the energization of solenoids 185 or 186, the switch arms are thrown into engagement with contacts B of these respective switches.

Current for the control devices may preferably be supplied from some suitable direct current source of comparatively low voltage, as is illustrated by battery 200. One of the lead wires 201 from this battery is connected by wire 202 to indicator needle 184 of pressure gauge 180.

It will be understood that I am now describing the control device for only one of the four mechanisms, one of which is situated at or near each corner of the platform. The other three are connected up in the same way as herein described, the source of current being common to all four.

A wire 203 leads from high pressure gauge contact 183 to the arm of switch $S^8$, while a wire 204 leads from the low pressure contact 182 to one side of solenoid 185. The other side of solenoid 185 is connected by wire 205 with the other lead wire 206 from battery 200. Also a wire 207 connects lead wire 206 with the arm of switch $S^9$. From the two contacts $a$ of switches $S^8$ and $S^9$ wires 208 and 209, respectively, lead to solenoid 186. Thus, it will be seen that solenoid 186 will be energized when needle 184 comes into contact with high pressure contact 183, the circuit being as follows: from battery 200 through wires 201 and 202, needle 184, contact 183, wire 203, switch $S^8$, wire 208, solenoid 186, wire 209, switch $S^9$, wire 207 and wire 206 to battery 200. On the other hand solenoid 185 will be energized if needle 184 comes into contact with low pressure contact 182; the circuit being as follows: from battery 200 through wires 201 and 202, through needle 184, then through low pressure contact 182, wire 204, solenoid 185, and wires 205 and 206 back to battery 200.

I will now explain in further detail the pressure equalizing action of one of the four pressure equalizing devices, and will afterwards explain the co-relation of these pressure equalizing devices with the leveling devices. Suppose for any reason that the pressure in one cylinder is comparatively low. Then solenoid 185 will be energized and switches $S^5$, $S^6$, $S^7$, $S^8$ and $S^9$ will be thrown over to disengage the switch arms and their contacts $a$ and to throw the switch arms of switches $S^5$, $S^6$, and $S^7$ into engagement with their contacts $b$. These three switches $S^5$, $S^6$, and $S^7$ control a three-phase current coming in on feed lines 210, 211 and 212; and in the last mentioned position of the switches these feed lines will then be connected to wires 213, 214, and 215, respectively, that lead to the three contacts of switch $S^3$, which is normally closed as hereinafter explained. From switch $S^3$ wires 216, 217, and 218 lead to wires 219, 220 and 221 that lead to motor M. Supply of current to the motor through switch $S^3$ will cause the motor to rotate in such a direction as to rotate the valve shaft 157 in the direction indicated by the arrow in Fig. 14, opening valve $160^b$ and allowing switch $S^1$ to close. The motor goes on rotating in said direction until pin 177 reaches bars 171, when switch $S^3$ will be opened, causing the rotation of the motor to cease, with valve $160^b$ in its open position. Fluid under pressure will flow through valve $160^b$ into the cylinder 147, increasing the pressure in that cylinder, until needle 184 goes out of engagement with contact 182. When this occurs solenoid 185 is deenergized and switches $S^5$, $S^6$, $S^7$, $S^8$, and $S^9$ go back to their normal positions with their arms in engagement with their respective contacts $a$. Then current from lead wires 210, 211 and 212 will flow through wires 222, 223, and 224 to switch $S^1$ (which is now closed) and then through wires 225, 226 and 227 to wires 219, 221 and 220, respectively; and the current then flows through motor M in such a direction as to make it rotate oppositely to its previous rotation, causing the pin 127 to be brought back against arms 170, opening switch $S^1$, and closing valve $160^b$ and thus stopping flow of fluid under pressure into the cylinder.

In case the pressure in the cylinder rises above the normal, then, by engagement of needle 184 with contact 183 the solenoid 186 is energized, switches $S^8$, and $S^9$ being at that time closed, as they always are unless solenoid 85 is energized. Energization of solenoid 186 throws switch arms of switches $S^{10}$, $S^{11}$, and $S^{12}$ over onto their contacts $b$. Then current flows from lead wires 210, 211, and 212 through switches $S^{10}$, $S^{11}$, and $S^{12}$, wires 230, 231, and 232 and through switch $S^4$, which is at that time closed, and thence through wires 233, 234, and 235, and wires 236, 238, and 237, to motor $M^1$ causing it to rotate valve shaft 157 in the direction indicated by the arrow in Fig. 14, opening valve $160^a$, allowing switch $S^2$ to close, and finally opening the switch $S^4$, causing the motor then to stop with valve $160^a$ in open position. Fluid under pressure will then flow out of the cylinder until indicator needle 184 leaves off engagement with contact 183 when solenoid 186 will be deenergized, causing switches $S^{10}$, $S^{11}$, and $S^{12}$ to move back to their normal positions where their switch arms engage with their respective contacts a. The current will flow through wires 239, 240, and 241 and through switch S², which is now closed, and then through wires 242, 243, and 244 to wires 236, 237 and 238 and then to motor M¹, causing the motor to rotate valve shaft 157 in the reverse direction, closing valve 160ᵃ, allowing switch S⁴ again to close, and finally opening switch S². The motor thus comes to a stop with the valve closed and with all the parts again in their normal position.

The function of the four devices hereinabove explained is to keep the pressures in the several cylinders at a certain predetermined point or points. And, generally, to give equal and even support to the frame of the mechanism, to keep the frame from being stressed and twisted, and, as explained hereinafter, to take care of any unusual circumstances such as unequal sinking of the four supports in the comparatively soft road bed or the riding of one or more supports up onto a comparatively large rock. How this is done will be generally apparent from the description given. For instance, if one of the supports tends to drop or tends to be forced up, the automatic pressure device in that corner will increase or relieve the pressure in the cylinder to properly compensate.

Figure 5:
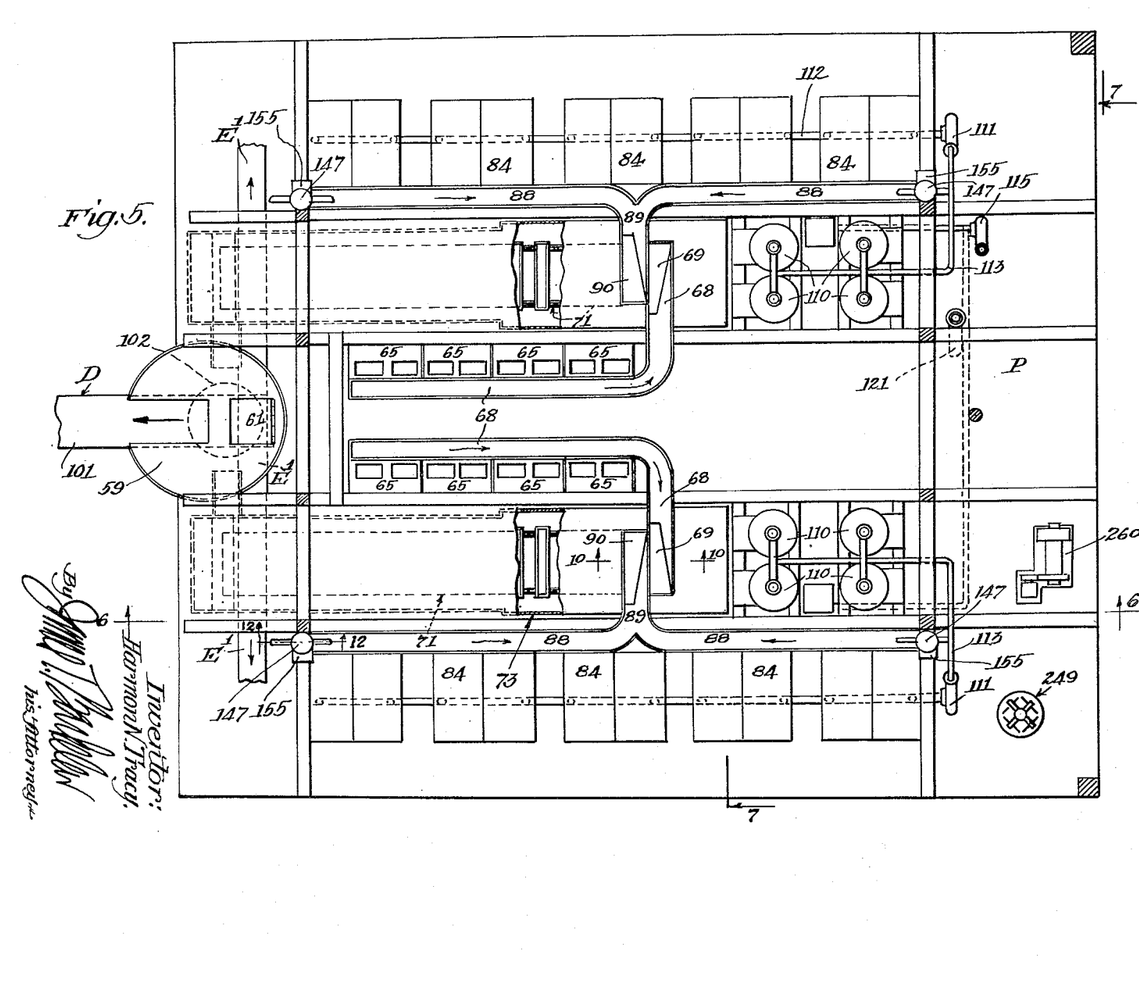
Fig. 5 is a plan section on line 5—5 of Fig. 4.

To keep the machine on a general level I provide a leveling control that is controlled by a plumb-bob or other equivalent device. For instance, as shown in Fig. 16, I may suspend a heavy ball 250 from a frame work 251, this ball being surrounded by four contact plates (see the diagram of Fig. 17). These four plates are connected into the four pressure control circuits by wires 256, 257, 258, and 259; but a description of a connection to one control mechanism will suffice. It will be noted that this plumb-bob control device, indicated generally at 249 in the plan of Fig. 5, is so placed that the contact plates are ordinated toward the four corners of the machine; so that if the machine sinks at one corner ball 250 will come into contact with the corresponding plate. If a whole side of the machine sinks, the ball 250 will come into contact with two of the plates that are connected to the two mechanisms at that side of the machine, it being understood that each plate is connected to the pressure control device at the corresponding corner of the machine. Thus, in the aspect shown in the diagram of Fig. 17 and in Fig. 5, the plate 252 is connected by wire 256 to the pressure control device at the lower left hand corner of the machine as shown in Fig. 5. This wire 256 leads to and connects with wire 204 that goes to solenoid 185. Ball 250 is connected by wire 260 with lead wire 201; so that when ball 250 goes into contact with plate 252 it energizes solenoid 185 just the same as solenoid 185 would be energized if pointer 184 had gone into contact with the low pressure contact 182; and the result of energization of solenoid 185 will be to build up the pressure, and thus raise that side or corner of the machine that is low.

When the plumb-bob acts as above described, say to raise one corner of the machine, at the same time that it operates to open the pressure valve 160ᵇ it also throws switches S⁸ and S⁹ so as to make it impossible for solenoid 186 at that corner to be energized. Thus, when the plumb-bob acts to cause increase of pressure at one or more corners at the same time it puts out of operation the automatic pressure releasing mechanism for that corner or those corners. Consequently, if the machine is tipped from its proper level position, by any cause whatsoever, fluid under pressure will be fed into the cylinders at the low corner or corners until the machine is back in level position, and regardless of how high a pressure may be necessary to get the machine back to level position. Of course, when the machine reaches a level position then, by the nature of the arrangement, the pressures in all four cylinders are again equalized as the weight is then equally distributed; but during the operation of getting the machine back to level, a pressure higher than normal may be necessary.

At the same time that the plumb-bob operation is causing a low corner to be raised, the natural result is a tendency to lower the opposite corner and to increase the fluid pressure in the cylinder at that corner. The pressure release mechanism at that corner then of course acts automatically to relieve that pressure, if necessary, to allow that opposite corner to be lowered. Thus increase of pressure at the low corner and relief pressure at the high corner will go on simultaneously, until the machine is on a level and the pressure is equalized.

Without the necessity of further detailed description, it will now be seen how various combinations of circumstances may be automatically taken care of by these automatic devices. Enough has been said to show that I provide two controls that are more or less independent of each other, but cooperating to produce the final desired effect; one control being directly actuated by virtue of the platform being thrown out of level, and the other being actuated by virtue of different pressures on the supporting cylinders. I may also say here that one function of the pressure increasing and releasing devices, is to keep the machine at substantially a predetermined height—to prevent the plumb-bob mechanism from gradually working the machine up higher and higher. If it is necessary occasionally to manually control or change the general level of the machine, or if it is desired to level up the machine by manual rather than automatic control, this may be easily done by using valves 250 which are placed around valves 160 and 160ª as shown in the diagram of Fig. 17.

If I have gone into some considerable detail in explaining the makeup and the operation of my devices, I have only done so for the purpose of making a typical form of the invention as illustrated in the drawings, clear and comprehensible to those skilled in the art. However, there are various structural details that I have thought it unnecessary to show in the drawings or refer to in this description; such for instance as the bracing of the frame work, or the details of the frame work itself. However, I do not wish it understood that I limit my invention to the particular details that I have set forth herein, except as specifically so limited in the appended claims, for it will be obvious to those skilled in the art that various changes and modifications may be made without departing from the spirit of the invention.

Having described a preferred form of my invention, I claim:

1. The herein described method of treating a placer deposit or the like with a portable ore treating mechanism, that includes excavating ahead of the portable mechanism sizing the excavated material and delivering the smaller sizes to the mechanism, and spreading at least a part of the spent material from the mechanism ahead of it to form a road-bed therefor.

2. The herein described method of treating a placer deposit or the like with a portable ore treating mechanism, that includes excavating ahead of the portable mechanism sizing the excavated material and delivering the smaller sizes to the mechanism, spreading a part of the spent material from the mechanism ahead of it to form a road-bed therefor in the excavation, and piling the remainder of the spent material in the excavation behind the portable mechanism.

3. The herein described method of treating a placer deposit or the like with a portable ore treating mechanism, that includes excavating ahead of the portable mechanism and delivering the excavated material to the mechanism, and spreading at least a part of the spent material from the mechanism ahead of it to form a road-bed therefor at an elevation substantially above the excavation floor.

4. The herein described method of treating a placer deposit or the like with a portable ore-treating mechanism, that includes excavating ahead of the portable mechanism and delivering the excavated material to the mechanism, spreading a part of the spent material from the mechanism ahead of it to form a road-bed therefor in the excavation at an elevation intermediate the excavation floor and the original ground surface, and piling the remainder of the spent material in the excavation behind the mechanism.

5. Mechanism of the character described, embodying a portable frame, concentrating devices thereon, a dirigible conveyor reaching ahead of the frame, on the forward end of which material may be delivered and its rear end delivering the material to the concentrating devices; other conveying mechanisms to carry away at least a part of the spent material from the concentrating devices and spread it ahead of the portable frame to form a road-bed therefor; and another conveyer mechanism to carry away the remainder of the spent material and pile it behind the frame, said last mentioned conveyer mechanism embodying a dirigible conveyer extending from the rear end of the portable frame.

6. A mechanism of the character described, embodying a portable frame, concentrating devices thereon, means to deliver material to the concentrating devices, conveyer mechanism to carry away at least a part of the spent material of the concentrating devices, and to spread it ahead of the portable frame to form a road-bed therefor, and means automatically to maintain the portable frame level.

7. A mechanism of the character described, embodying a portable frame, concentrating devices thereon, a conveyer connected to the portable frame and reaching out ahead of it, the forward end of the conveyer being independently supported so that its weight is not carried by the frame, and said conveyer being dirigible with reference to the frame, the rear end of said conveyer delivering material to the concentrating device, a tail piling conveyer connected with the frame and dirigible with reference thereto and adapted to carry away at least a part of the spent material from the concentrating device, another conveyer mechanism adapted to carry at least a part of the spent material to the forward part of the frame and spread it forward of the frame to form a road-bed therefor, and means automatically to maintain the frame level.

8. A mechanism of the character described, embodying a portable frame, concentrating devices thereon, means to deliver material to the concentrating devices, a tail piling conveyer adapted to carry away at least a part of the spent material from the concentrating devices, another conveyer mechanism adapted to carry away at least a part of the spent material and to spread that material ahead of the portable frame to form a road-bed therefor, and controllable means to vary the proportion of the spent material to be carried away by the two last mentioned conveyers.

9. Mechanism of the character described, embodying a portable frame, concentrating devices thereon, a dirigible conveyer reaching ahead of the frame, on the forward end of which material may be delivered and its rear end delivering the material to the concentrating devices; other conveying mechanisms to carry away at least a part of the spent material from the concentrating devices and spread it ahead of the portable frame to form a road-bed therefor; and another conveyer mechanism to carry away the remainder of the spent material and pile it behind the frame, said last mentioned conveyer mechanism embodying a dirigible conveyer extending from the rear end of the portable frame, and means to maintain the frame level.

In witness that I claim the foregoing I have hereunto subscribed my name this 11th day of January, 1923.

HARMON N. TRACY.